(12) United States Patent
Lee

(10) Patent No.: US 9,175,589 B2
(45) Date of Patent: Nov. 3, 2015

(54) FUEL INJECTOR FOR DIESEL PARTICULATE FILTER

(71) Applicant: DOOSAN CORPORATION, Seoul (KR)

(72) Inventor: Sang Hun Lee, Seoul (KR)

(73) Assignee: Doosan Corporation, Seoul (KR)

( * ) Notice: Subject to any disclaimer, the term of this patent is extended or adjusted under 35 U.S.C. 154(b) by 0 days.

(21) Appl. No.: 14/412,371

(22) PCT Filed: Jun. 28, 2013

(86) PCT No.: PCT/KR2013/005767
§ 371 (c)(1),
(2) Date: Dec. 31, 2014

(87) PCT Pub. No.: WO2014/007492
PCT Pub. Date: Jan. 9, 2014

(65) Prior Publication Data
US 2015/0135684 A1    May 21, 2015

(30) Foreign Application Priority Data
Jul. 2, 2012   (KR) .................. 10-2012-0071632

(51) Int. Cl.
*F01N 3/36*   (2006.01)
*F01N 3/023*   (2006.01)
(Continued)

(52) U.S. Cl.
CPC ............ *F01N 3/0234* (2013.01); *F01N 3/0253* (2013.01); *F01N 9/002* (2013.01); *F01N 3/36* (2013.01); *F01N 2240/02* (2013.01); *F01N 2610/03* (2013.01); *F01N 2610/105* (2013.01);
(Continued)

(58) Field of Classification Search
CPC ..... F01N 3/0253; F01N 3/36; F01N 2240/02; F01N 2610/03; F01N 2610/10; F01N 2610/105; F01N 2610/1453; F01N 2610/1486; F01N 2900/1811
USPC .................... 60/286, 287, 295, 303, 311, 320
See application file for complete search history.

(56) References Cited

U.S. PATENT DOCUMENTS 4,677,823 A * 7/1987 Hardy .............................. 60/274
6,810,661 B2   11/2004 Lambert et al.
(Continued)

FOREIGN PATENT DOCUMENTS

JP        4662886 B2    3/2011
JP     2011144747 A    7/2011

OTHER PUBLICATIONS

International Search Report dated Sep. 4, 2013 and written in Korean with English translation for International Patent Application No. PCT/KR2013/005767 filed Jun. 28, 2013, 4 pages.

*Primary Examiner* — Thomas Denion
*Assistant Examiner* — Jorge Leon, Jr.
(74) *Attorney, Agent, or Firm* — John D. Veldhuis-Kroeze; Westman, Champlin & Koehler, P.A.

(57) ABSTRACT

The present disclosure relates to a fuel injector for a diesel particulate filter, and more particularly, to a fuel injector for a diesel particulate filter which is capable of combusting and removing particulate matters included in the exhaust gas by injecting fuel into an exhaust gas discharge line. The present disclosure can prevent fuel from being frozen when fuel is intended to be injected into an exhaust gas line during the winter season or in a cold region, thereby allowing DPF regeneration to be smoothly carried out.

2 Claims, 1 Drawing Sheet

(51) Int. Cl.
*F01N 9/00* (2006.01)
*F01N 3/025* (2006.01)

(52) U.S. Cl.
CPC ... *F01N 2610/146* (2013.01); *F01N 2610/1453* (2013.01); *F01N 2610/1486* (2013.01); *F01N 2900/1811* (2013.01); *Y02T 10/47* (2013.01)

(56) References Cited

U.S. PATENT DOCUMENTS

| | | | |
|---|---|---|---|
| 7,966,811 B2 | 6/2011 | Reed | |
| 2008/0209890 A1* | 9/2008 | Cox et al. | 60/286 |
| 2011/0185702 A1 | 8/2011 | Bilton et al. | |

* cited by examiner

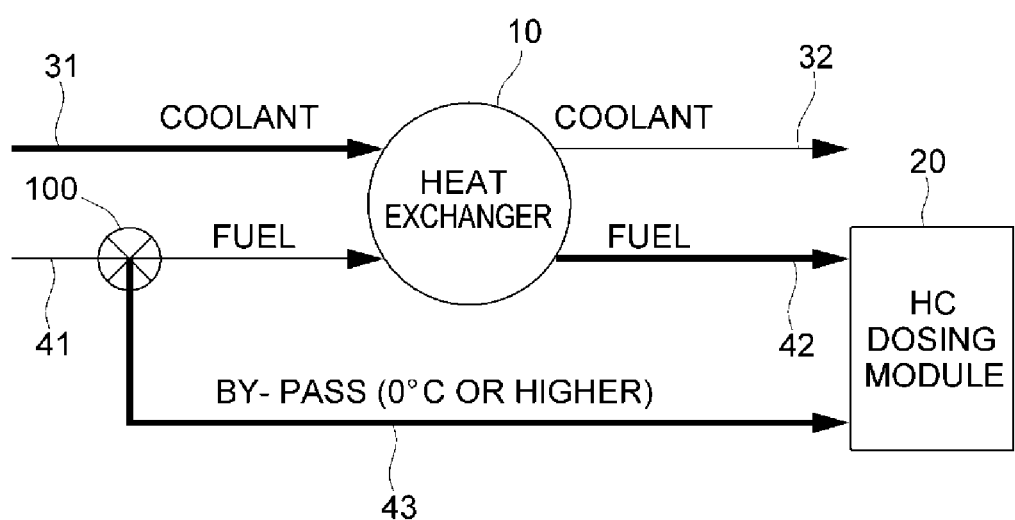

FUEL INJECTOR FOR DIESEL PARTICULATE FILTER

CROSS-REFERENCE TO RELATED APPLICATION

This Application is a Section 371 National Stage Application of International Application No. PCT/KR2013/005767, filed Jun. 28, 2013 and published, not in English, as WO/2014007492A1 on Jan. 9, 2014.

FIELD OF THE DISCLOSURE

The present disclosure relates to a fuel injector for a diesel particulate filter, and more particularly, to a fuel injector for a diesel particulate filter which is capable of combusting and removing particulate matters included in the exhaust gas by injecting hydrocarbon into an exhaust gas discharge line.

BACKGROUND OF THE DISCLOSURE

In general, diesel engines are mounted in industrial vehicles such as forklift trucks, or construction machines. The diesel engine emits exhaust gas, and a nitrogen oxide (NOx) is included in the exhaust gas.

The nitrogen oxide is known as a substance that needs to be removed because the nitrogen oxide causes air pollution. As a means for removing the nitrogen oxide, a diesel particulate filter (DPF) is used.

Meanwhile, particulate matters are included in the exhaust gas. The particulate matters (PM) may mean smoke, dust, and soot.

The particulate matters clog fine gaps while passing through the diesel particulate filter and hinder a flow of fluid, and causes a problem in that performance of the diesel particulate filter deteriorates. Therefore, processes of removing the particulate matters and regenerating performance of the diesel particulate filter are carried out.

The aforementioned processes of regenerating performance of the diesel particulate filter may be carried out in accordance with a planned schedule or manually by a driver, and these series of processes are called DPF regeneration.

Currently, a method of injecting fuel into an exhaust line to combust fuel, and combusting and removing the particulate matters using heat from the combustion is known as a method of removing the particulate matters.

In addition, when the industrial vehicle or the construction machine is used during the winter season or in a cold region, a fuel line may become frozen. In particular, in a case in which an engine room is not protected from the cold, the line through which fuel is injected may become more frequently frozen.

As described above, in a case in which a fuel injector which injects fuel into the exhaust gas line is frozen, there is a problem in that the DPF regeneration cannot be smoothly carried out.

Therefore, it is required to provide countermeasures that prevent the fuel line, through which fuel is injected, from being frozen.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Therefore, a technical object to be achieved in some embodiments of the present disclosure is to provide a fuel injector for a diesel particulate filter which is capable of preventing fuel from being frozen when fuel is intended to be injected into an exhaust gas line during the winter season or in a cold region, thereby allowing DPF regeneration to be smoothly carried out.

A technical problem to be achieved in some embodiments of the present disclosure is not limited to the aforementioned technical problem, and any other not-mentioned technical problem will be obviously understood from the description below by those skilled in the technical field to which the present disclosure pertains.

In order to achieve the technical problem, a fuel injector for a diesel particulate filter according to some embodiments of the present disclosure includes: a heat exchanger 10 which allows heat exchange between a coolant and fuel to be performed; a first coolant line 31 which is disposed upstream of the heat exchanger 10 and into which the coolant flows; a second coolant line 32 which is disposed downstream of the heat exchanger 10 and through which the coolant is discharged; a first fuel line 41 which is disposed upstream of the heat exchanger 10 and into which the fuel flows; a second fuel line 42 which is disposed downstream of the heat exchanger 10 and through which the fuel is discharged; an HC dosing module 20 which is supplied with the fuel from the second fuel line 42 and supplies the fuel to an exhaust gas line disposed at a front side of a diesel particulate filter (DPF); a third fuel line 43 which branches off from the first fuel line 41 and through which the fuel is provided to the HC dosing module 20 while bypassing the heat exchanger 10; and an automatic temperature adjusting valve unit 100 which is installed at a point where the third fuel line 43 branches off from the first fuel line 41, opens a side directed toward the heat exchanger 10 and closes a side directed toward the HC dosing module 20 when the current temperature is lower than a predetermined temperature, and opens the side directed toward the HC dosing module 20 and closes the side directed toward the heat exchanger 10 when the current temperature is higher than the predetermined temperature.

In addition, according to the fuel injector for a diesel particulate filter according to some embodiments of the present disclosure, the predetermined temperature may be 0° C.

Specific items of other exemplary embodiments are included in the detailed description and the drawings.

According to the fuel injector for a diesel particulate filter according to some embodiments of the present disclosure, which is configured as described above, when the current temperature is lower than the predetermined temperature by measuring a temperature of the fuel line, the coolant line and the fuel line may be connected to the heat exchanger such that fuel is heated, and the heated fuel may be provided to the HC dosing module. Accordingly, during the winter season or in a cold region, fuel may be provided to the exhaust gas line, such that DPF regeneration may be smoothly carried out.

DESCRIPTION OF THE DRAWINGS

FIG. 1 is a view for explaining a fuel injector for a diesel particulate filter according to an exemplary embodiment of the present disclosure.

DESCRIPTION OF MAIN REFERENCE NUMERALS OF THE DRAWINGS

10: Heat exchanger
20: HC (hydrocarbon) dosing module
31, 32: First and second coolant lines
41, 42, 43: First, second, and third fuel lines
100: Automatic temperature adjusting valve unit

DETAILED DESCRIPTION

Advantages and features of the present disclosure and methods of achieving the advantages and features will be clear with reference to an exemplary embodiment described in detail below together with the accompanying drawings.

Like reference numerals indicate like elements throughout the specification.

Meanwhile, the terms used in the description are defined considering the functions of the present disclosure and may vary depending on the intention or usual practice of a manufacturer. Therefore, the definitions should be made based on the entire contents of the present specification.

Hereinafter, a fuel injector for a diesel particulate filter according to an exemplary embodiment of the present disclosure will be described with reference to FIG. 1.

The attached FIG. 1 is a view for explaining a fuel injector for a diesel particulate filter according to an exemplary embodiment of the present disclosure.

The fuel injector for a diesel particulate filter (DPF) according to the exemplary embodiment of the present disclosure allows heat exchange between a coolant and fuel to be performed, and provides fuel to an exhaust gas line disposed at a front side of the diesel particulate filter during the winter season or in a cold region.

The fuel injector for a diesel particulate filter according to the exemplary embodiment of the present disclosure allows heat exchange between a coolant and fuel to be performed by a heat exchanger 10 so as to provide fuel in an unfrozen fluid state to the fuel injector.

First and second coolant lines 31 and 32 are disposed upstream and downstream of the heat exchanger 10, respectively. Coolant flows into the first coolant line 31, and the coolant passing through the heat exchanger 10 is discharged through the second coolant line 32.

The coolant is a fluid that circulates to prevent a diesel engine from overheating, and the coolant is heated such that a temperature of the coolant may be higher than a room temperature.

In addition, first and second fuel lines 41 and 42 are disposed upstream and downstream of the heat exchanger 10, respectively. Fuel flows into the first fuel line 41, and fuel passing through the heat exchanger 10 is discharged through the second fuel line 42.

An HC injector 20 is connected at the other side of the second fuel line 42.

That is, the HC injector 20 is supplied with fuel in a fluid state, and provides fuel to the exhaust gas line disposed at the front side of the diesel particulate filter.

Meanwhile, a third fuel line 43 branches off from the first fuel line 41, and an automatic temperature adjusting valve unit 100 is installed at a point where the third fuel line 43 branches off from the first fuel line 41.

The third fuel line 43 is used as a line that provides fuel to the HC dosing module 20 while allowing fuel to bypass the heat exchanger 10.

The automatic temperature adjusting valve unit 100 is a three-way valve, and based on a predetermined temperature, one side of the automatic temperature adjusting valve unit 100 is opened in a specific direction, and the other side of the automatic temperature adjusting valve unit 100 is closed.

In more detail, the automatic temperature adjusting valve unit 100 opens a side directed toward the heat exchanger 10, and closes a side directed toward the HC dosing module 20 in a case in which the current temperature is lower than a predetermined temperature. In addition, in a case in which the current temperature is higher than the predetermined temperature, the automatic temperature adjusting valve unit 100 opens the side directed toward the HC dosing module 20, and closes the side directed toward the heat exchanger 10.

Accordingly, in a case in which the current temperature is lower than the predetermined temperature, fuel flows into the first fuel line 41, and flows to the HC dosing module 20 while passing through the heat exchanger 10. In contrast, in a case in which the current temperature is higher than the predetermined temperature, fuel flows to the HC dosing module 20 while bypassing the heat exchanger 10.

On the other hand, in the exemplary embodiment of the present disclosure, the temperature set to the automatic temperature adjusting valve unit 100 may be 0° C. However, the present disclosure is not limited thereto, and even though a freezing point of water is 0° C. under standard atmospheric pressure, the freezing point of water may be varied because atmospheric pressure is changed in a high altitude region, and as a result, the predetermined temperature may be appropriately set in consideration of local atmospheric pressure.

In addition, because the temperature may drop in accordance with an air flow rate, the predetermined temperature may be changed in consideration of conditions such as ambient environment.

On the other hand, the automatic temperature adjusting valve unit 100 may have a temperature sensor which senses a temperature, and a valve that is operated by a solenoid. The temperature sensor may sense a temperature of fuel, but may be installed at any portion exposed to the atmosphere in the line through which fuel is supplied to the HC dosing module 20. That is, when there is concern that fuel will become frozen, fuel passes through the heat exchanger, such that fuel may smoothly flow and be injected.

As described above, according to the fuel injector for a diesel particulate filter according to the exemplary embodiment of the present disclosure, when the current temperature is lower than the predetermined temperature by measuring a temperature of the fuel line, the coolant line and the fuel line may be connected to the heat exchanger such that fuel is heated, and the heated fuel may be provided to the HC dosing module. Accordingly, during the winter season or in a cold region, fuel may be provided to the exhaust gas line, such that it is possible to prevent the DPF from being clogged or prevent performance of the DPF from deteriorating, and particularly, DPF regeneration may be smoothly carried out.

The exemplary embodiments of the present disclosure have been described with reference to the accompanying drawings, but those skilled in the art will understand that the present disclosure may be implemented in any other specific form without changing the technical spirit or an essential feature thereof.

Accordingly, it should be understood that the aforementioned exemplary embodiment is described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

The fuel injector for a diesel particulate filter according to the present disclosure may be used to inject fuel into an exhaust gas line, remove particulate matters using heat from combustion, and carry out DPF regeneration.

What is claimed is:

1. A fuel injector for a diesel particulate filter, comprising:
    a heat exchanger which allows heat exchange between a coolant and fuel to be performed;
    a first coolant line which is disposed upstream of the heat exchanger and into which the coolant flows;
    a second coolant line which is disposed downstream of the heat exchanger and through which the coolant is discharged;
    a first fuel line which is disposed upstream of the heat exchanger and into which the fuel flows;
    a second fuel line which is disposed downstream of the heat exchanger and through which the fuel is discharged;
    an HC dosing module which is supplied with the fuel from the second fuel line and supplies the fuel to an exhaust gas line disposed at a front side of a diesel particulate filter (DPF);
    a third fuel line which branches off from the first fuel line and through which the fuel is provided to the HC dosing module while bypassing the heat exchanger; and
    an automatic temperature adjusting valve unit which is installed at a point where the third fuel line branches off from the first fuel line, opens a side directed toward the heat exchanger and closes a side directed toward the HC dosing module when the current temperature is lower than a predetermined temperature, and opens the side directed toward the HC dosing module and closes the side directed toward the heat exchanger when the current temperature is higher than the predetermined temperature.

2. The fuel injector for a diesel particulate filter of claim 1, wherein the predetermined temperature is 0° C.

* * * * *